United States Patent [19]

Krahnke et al.

[11] Patent Number: 5,470,923
[45] Date of Patent: * Nov. 28, 1995

[54] MOISTURE-CURABLE SILICONE PRESSURE-SENSITIVE ADHESIVES

[75] Inventors: Robert H. Krahnke; Shawn K. Mealey; William J. Schoenherr, all of Midland; Schuyler B. Smith, deceased, late of Midland, by Bruce M. Groom, legal representative; Thomas J. Tangney, Midland, all of Mich.

[73] Assignee: Dow Corning Corporation, Midland, Mich.

[*] Notice: The portion of the term of this patent subsequent to May 11, 2010, has been disclaimed.

[21] Appl. No.: 63,105

[22] Filed: May 14, 1993

Related U.S. Application Data

[63] Continuation of Ser. No. 748,478, Aug. 22, 1991, abandoned.

[51] Int. Cl.⁶ .................................................. C08F 283/00
[52] U.S. Cl. ........................ 525/477; 525/474; 518/17
[58] Field of Search .......................... 528/17; 525/474, 525/477

[56] References Cited

U.S. PATENT DOCUMENTS

| | | | |
|---|---|---|---|
| 4,143,088 | 3/1979 | Favre et al. | 525/477 |
| 4,309,520 | 1/1982 | Blizzard | 525/477 |
| 4,584,355 | 4/1986 | Blizzard et al. | 525/477 |
| 4,847,400 | 7/1989 | Krahnke et al. | 556/412 |
| 4,962,174 | 10/1990 | Bilgrien et al. | 525/474 |
| 5,079,311 | 1/1992 | Colas | 525/478 |
| 5,091,484 | 2/1992 | Colas et al. | 525/477 |
| 5,208,300 | 5/1993 | Krahnke et al. | 525/474 |
| 5,210,156 | 5/1993 | Clark et al. | 525/477 |

FOREIGN PATENT DOCUMENTS

| | | | |
|---|---|---|---|
| 0307098A2 | 8/1988 | European Pat. Off. | C07F 7/18 |
| 0360516A2 | 9/1989 | European Pat. Off. | C09J 183/04 |
| 0380875A2 | 12/1989 | European Pat. Off. | C08L 83/04 |
| 2345491 | 3/1976 | France | C08L 83/04 |

OTHER PUBLICATIONS

Central Patents Index Basics Abstract Journal, Section A Derwent Publications 1985; May 22, 1985.

*Primary Examiner*—Melvyn I. Marquis
*Assistant Examiner*—Margaret W. Glass
*Attorney, Agent, or Firm*—Sharon K. Severance

[57] ABSTRACT

Silicone pressure sensitive adhesive compositions which cure in the presence of moisture comprise an adhesive component which bears alkoxy radical-containing curing radicals and, optionally, a catalyst to accelerate the reaction of moisture with the alkoxy radicals to form siloxane bonds. Curing provides adhesives ranging from pressure sensitive adhesives having improved properties to permanent adhesives. The adhesives are useful for adhering an object to a surface and thereafter improving the bond between the object and the surface by exposure to moisture.

19 Claims, No Drawings

MOISTURE-CURABLE SILICONE PRESSURE-SENSITIVE ADHESIVES

This is a continuation of application Ser. No. 07/748,478 filed on Aug. 22, 1991, now abandoned.

BACKGROUND OF THE INVENTION

The present invention relates to compositions which provide silicone pressure sensitive adhesives, hereinafter also referred to as SPSAs, which cure by the action of ambient moisture, and to a method for their preparation. In a preferred embodiment the present invention relates to SPSA compositions which cure to a permanent adhesive which is useful as a structural adhesive.

By the term "silicone pressure sensitive adhesive" it is meant an adhesive comprising one or more siloxane components and possessing sufficient tack and cohesive strength so that it can be adhered with mild pressure to a clean stainless steel substrate and then removed therefrom and adhered to the same or another clean substrate. By the term "permanent adhesive" it is meant an adhesive that bonds to a clean substrate and cannot be so removed and thereafter readhered.

At the present time all commercial SPSA compositions are designed for the relatively low strength bonding of surfaces, such as electrical insulating tapes, medical tapes and devices and high temperature masking tapes. These commercial SPSA compositions are also designed to possess their ultimate adhesive properties when first applied.

However, there is a need for a SPSA which will provide higher bonding strengths and/or which will develop additional adhesive properties, such as resistance to flow or long term durability, after being applied.

Silicone structural glazing of curtainwall panels represents one of those needs. Durable structural glazing is currently done with silicone sealants in a multi-step, labor-intensive, time-consuming process. Significant improvements in the structural glazing process could be realized if a SPSA were used in place of the silicone sealant in the current process.

Unfortunately, standard SPSAs are not completely suitable for structural glazing applications because of their inherent flowability, albeit slow in the recently improved SPSAs, under sustained stress. Under the sustained stress of gravity the heavy glass panel that is currently used in structural glazing, if supported only by pressure sensitive adhesive, would eventually experience shear failure of the bond. A SPSA that cures to a non-shearing adhesive having high adhesive strength would be very beneficial in this and other applications.

Currie et al., U.S. Pat. No. 2,814,601, disclose SPSA compositions which are useful for bonding silicone rubber to metal, such as aluminum, and which will cure to a permanent bond adhesive at room temperature.

Blizzard et al., U.S. Pat. No. 4,613,53 claims a permanent-bond adhesive for bonding coated fabric that is used in the construction of air- or tension-supported structures.

However, the compositions of Currie et al. and of Blizzard et al. cure spontaneously at room temperature when mixed, even in the absence of moisture, and therefore cannot be mixed and stored before use but, rather, must be used shortly after being prepared.

BRIEF SUMMARY OF THE INVENTION

It is an object of this invention to provide new SPSAs, and compositions for their preparation, which experience an increase in one or more adhesive properties when exposed to moisture. It is another object of this invention to provide compositions which provide SPSAs which will become a permanent adhesive in the presence of ambient moisture. It is a further object of this invention to provide a SPSA composition which can be prepared and stored until used to provide a moisture-curable SPSA, when desired, without further mixing or processing. It is a preferred object of this invention to provide new SPSAs, and compositions for their preparation, which are suitable for structural glazing applications. It is a related object of this invention to provide a method for preparing the compositions of this invention.

These objects, and others which will become apparent to one of ordinary skill in the pressure sensitive adhesive art upon considering the following disclosure and appended claims, are obtained by the present invention which, briefly stated, comprise preparing a silicone pressure sensitive adhesive, suitably substituted with silicon-bonded curing radicals, which will cure via the curing radicals to a stronger SPSA, and preferably, a permanent adhesive when exposed to ambient moisture. A catalyst is advantageously included to promote the moisture-initiated reaction of the silicon-bonded curing radicals to form siloxane bonds. In preferred compositions of this invention the silicon-bonded curing radicals bear trimethoxysilylalkyl moieties and the catalyst is an organic titanate.

The method of this invention comprises modifying a SPSA composition so that it bears the necessary curing radicals or preparing a SPSA composition from components which bear the necessary curing radicals.

The compositions of this invention are useful for adhering an object to a substate without the need for means to hold the object in place while the adhesive cures.

DETAILED DESCRIPTION OF THE INVENTION

In a first embodiment the present invention relates to a composition comprising a silicone pressure sensitive adhesive component bearing curing radicals having the formula $R_b(OR')_{3-b}SiZ-$ wherein Z denotes a divalent radical linking the silicon atom of the curing radical to a silicon atom of the silicone pressure sensitive adhesive component, R denotes a monovalent hydrocarbon radical, R' denotes an alkyl or alkoxyalkyl radical, and the subscript b has a value of 0 or 1;

all other silicon-bonded radicals of the silicone pressure sensitive adhesive component being selected from the group consisting of divalent oxygen atoms linking silicon atoms, hydroxyl radicals, hydrogen atoms and monovalent hydrocarbon radicals.

Curing radicals having the formula $R_b(OR')_{3-b}SiZ-$ are present in the SPSA component to provide a way to improve one or more physical properties of the SPSA. R, when present, can be any monovalent hydrocarbon radical having, for example, from 1 to 10, preferably 1 to 6, carbon atoms, such as lower alkyl radicals exemplified by methyl, ethyl, propyl and isopropyl; alkenyl, such as vinyl; and aryl, such as phenyl. To obtain maximum curing rates for the adhesive compositions of this invention it is preferred that the value of subscript b in the curing radical formula is zero; however, when b=1, R is preferably the methyl radical.

R' denotes any alkyl or alkoxyalkyl radical, preferably having less than 5 carbon atoms, such as methyl, ethyl, isopropyl, methoxyethyl or ethoxyethyl. R' is preferably methyl.

Z denotes any divalent radical which durably links the silicon atom of the curing radical to a silicon atom of the SPSA so that (a) the silicon atom of the curing radical is not removed from the SPSA component during moisture-curing of the SPSA and (b) the moisture-curing reaction is not adversely limited. Z has no other known requirements.

Z is typically selected from the types of divalent radicals that are used to link silicon atoms in a hydrolytically stable manner and include, for example, oxygen; hydrocarbon, such as alkylene, exemplified by ethylene, propylene and isobutylene, and phenylene; hydrocarbon containing one or more hetero atoms selected from oxygen, nitrogen and sulfur, such as ether—, thioether—, ester— or amide-containing hydrocarbon; siloxane, such as polydimethylsiloxane; and combinations thereof.

Preferably, Z is selected from the group of radicals having the formula $—(C_2H_4SiMe_2)_x(OSiMe_2)_yD—$. Herein Me denotes methyl and D denotes oxygen or $C_2H_4$. The value of the subscript x can range from 0 to 2, preferably 1, and the subscript y can range from 0 to 6, preferably 0 or 1, each both inclusive, and the sum of x+y is zero or more.

Preferred Z includes silhydrocarbonsiloxane linkages, such as $—(OSiMe_2)CH_2CH_2—$, $—(CH_2CH_2SiMe_2)(OSiMe_2)CH_2CH_2—$, $—(CH_2CH_2SiMe_2)O—$, and $—(CH_2CH_2SiMe_2)(OSiMe_2)O—$; silhydrocarbon linkages, such as $—(CH_2CH_2SiMe_2)CH_2CH_2—$ and $—CH_2CH_2—$; and siloxane linkages, such as $—(OSiMe_2)O—$ and $—O—$.

Specific examples of suitable curing radicals include, but are not limited to $(MeO)_3SiCH_2CH_2—$, $(MeO)_3SiO—$, $Me(MeO)_2SiO—$, $(MeO)_3SiCH_2CH_2SiMe_2CH_2CH_2SiMe_2O—$, $(MeO)_3SiCH_2CH_2SiMe_2O—$, $(MeO)_3SiCH_2CH_2SiMe_2OSiMe_2O—$ and $(MeO)_3SiCH_2CH_2SiMe_2OSiMe_2CH_2CH_2—$.

Herein the ethylene radical is sometimes written as $C_2H_4$ to indicate the isomeric mixture of $CH_2CH_2$ and $CH_3CH$ linkages that are obtained when a hydrosilylation reaction between a silicon-bonded vinyl radical and a silicon-bonded hydrogen atom occurs. For example, the formula $(MeO)_3SiC_2H_4SiMe_2O—$ is to be construed as encompassing $(MeO)_3SiCH_2CH_2SiMe_2O—$ and/or $(MeO)_3SiCH(CH_3)SiMe_2O—$.

Silicon-bonded radicals of the silicone pressure sensitive adhesive component which are not curing radicals having the formula indicated are selected from divalent oxygen atoms linking silicon atoms and monovalent radicals selected from hydroxyl radicals, hydrogen atoms and the hydrocarbon radicals noted above for R.

The SPSA component of the compositions of this invention bearing curing radicals can be prepared by introducing the required curing radicals, in any desired sequence, into a preformed SPSA and/or into one or more of the siloxane components of the SPSA, by way of reactive sites, such as silicon-bonded hydroxyl or vinyl radicals, therein.

SPSA compositions which can be converted to the SPSA component of the compositions of this invention comprises (1) an organopolysiloxane resin and (2) a polydiorganosiloxane gum. The weight ratio of resin (1) to gum (2) in the SPSAs ranges from 5/95 to 70/30, preferably 40/60 to 60/40. The silicon-bonded radicals of these SPSAs are selected from the group consisting of divalent oxygen atoms linking silicon atoms, hydroxyl radicals, and monovalent hydrocarbon radicals, such as alkyl, aryl, alkenyl, cycloalkyl, cycloalkenyl, aralkyl and alkaryl; and hydrogen atoms.

The organopolysiloxane resin (1) consists essentially of $R^1_3SiO_{1/2}$ siloxane units and $SiO_{4/2}$ siloxane units and can be dissolved, substantially completely, in either a hydrocarbon liquid such as benzene, toluene, xylene, heptane and the like or in a silicone liquid such as a low viscosity cyclic or linear polydiorganosiloxanes.

In the $R^1_3SiO_{1/2}$ siloxane units $R^1$ denotes a monovalent hydrocarbon radical preferably having less than 20 carbon atoms, and most preferably having from 1 to 10 carbon atoms, a hydroxyl radical or a hydrogen atom.

Examples of suitable hydrocarbon $R^1$ radicals include alkyl radicals, such as methyl, ethyl, propyl, pentyl, octyl, undecyl and octadecyl; alkenyl radicals, such as vinyl, allyl and 5-hexenyl; cycloaphatic radicals, such as cyclohexyl and cyclohexenylethyl; and aryl radicals such as phenyl, tolyl, xylyl, benzyl and 2-phenylethyl.

At least one-third, and more preferably substantially all $R^1$ radical, in the formula for component (1) are methyl radicals. Examples of preferred $R^1_3SiO_{1/2}$ siloxane units include $HMe_2SiO_{1/2}$, $Me_3SiO_{1/2}$, $PhMe_2SiO_{1/2}$ and $Me_2ViSiO_{1/2}$ where Me, Ph and Vi denote methyl, phenyl and vinyl.

The mol ratio of the $R^1_3SiO_{1/2}$ siloxane units to $SiO_{4/2}$ siloxane units of component (1) has a value of from 0.5/1 to 1.5/1, preferably from 0.6/1 to 0.9/1. These mol ratios are easily measured by $Si^{29}$ n.m.r. spectroscopy.

Component (1) consisting essentially of $R^1_3SiO_{1/2}$ siloxane units and $SiO_{4/2}$ siloxane units can be prepared by any suitable method. That is to say, it is believed that the organopolysiloxane resin (1) can be prepared by, for example, silane co-hydrolysis methods or silica hydrosol capping methods known in the art. Component (1) is preferably prepared by the silica hydrosol capping processes of Daudt, et al., U.S. Pat. No. 2,676,182; of Rivers-Farrell et al., U.S. Pat. No. 4,611,042; and of Butler, U.S. Pat. No. 4,774,310; each incorporated herein to teach how to prepare organopolysiloxane resins which can be reacted to contain curing radicals or which can be used to make SPSAs which can be reacted to contain curing radicals.

Component (2) of the SPSA component to be converted to contain curing radicals is a polydiorganosiloxane gum having the general formula $R^3R^2_2SiO(R^2_2SiO)_nSiR^2_2R_3$. In this formula each $R^2$ denotes a hydrogen atom or a monovalent hydrocarbon radical and each $R^3$ denotes a radical selected from the group consisting of $R^2$ radicals and OH radicals. Examples of $R^2$ radicals include the hydrocarbon radicals delineated above for $R^1$, including preferred species.

At least 50%, and preferably at least 90%, of the $R^2$ radicals of Component (2) are methyl radicals. The methyl radicals can be distributed in any preferred manner in the polydiorganosiloxane.

General examples of polydiorganosiloxanes which are suitable for use as component (2) in the compositions of this invention include hydroxyl—, hydrogen— and hydrocarbon-terminated polydiorganosiloxanes. Specific examples of these polydiorganosiloxane include, but are not limited to, the polydiorganosiloxanes in the examples disclosed below and $ViMe_2SiO(Me_2SiO)_nSiMe_2Vi$, $ViMe_2SiO(Me_2SiO)_{0.98n}(MeViSiO)_{0.02n}SiMe_2Vi$, $Me_3SiO(Me_2SiO)_{0.9n}(MeViSiO)_{0.1n}SiMe_3$, $HMe_2SiO(Me_2SiO)_nSiMe_2H$, $Me_3SiO(Me_2SiO)_{0.9n}(MeHSiO)_{0.1n}SiMe_3$, $HOMe_2SiO(Me_2SiO)_nSiMe_2OH$, and $HOR^2_2SiO(Me_2SiO)_{0.95n}(MeViSiO)_{0.05n}SiR^2_2OH$, wherein Me, Vi and Ph denote methyl, vinyl and phenyl, respectively.

The average values of the subscript n in the above formulae are such that the organopolysiloxane component (2) has a viscosity at 25° C. of from 100,000 centipoise (100 pascal-seconds) to 100,000,000 centipoise (100 kilopascal-seconds) and more. The exact value of the subscript n needed to provide a viscosity value falling within said limits depends upon the identity of the $R^2$ radicals; however, for hydroxyl-terminated and/or $R^2$-terminated polydiorganosiloxanes containing at least 90% methyl radicals n will have a value ranging from one to several thousands. From a consideration of maximum adhesive properties, component (2) is preferably a gum having a viscosity of at least 1,000,000 centipoise at 25° C.

Component (2) can comprise trace amounts of siloxane branching sites, such as $R^2SiO_{3/2}$ units and $SiO_{4/2}$ units, and can be comprised of a single polydiorganosiloxane or a mixture of two or more different polydiorganosiloxanes, if desired.

Polydiorganosiloxanes are well known in the organosilicone art and their synthesis needs no extensive delineation herein. Many are commercially available from major silicone manufacturers.

SPSAs having sites of the formula ≡SiOH, herein also denoted as a silanol-functional SPSA, can be any of those known in the art. The disclosures of U.S. Pat. Nos. 2,736,721; 2,814,601; 2,857,356; 3,527,842; 3,528,940; 3,839,075; 3,929,704; 3,983,298; 4,309,520; 4,584,355; 4,591,622; and 4,774,297 are incorporated herein by reference to illustrate silanol-functional SPSAs that can be used to prepare the moisture-curable SPSA component of the compositions of this invention.

SPSAs having sites of the formula ≡Si-alkenyl, herein also denoted as an alkenyl-functional SPSA, can be prepared, for example, by replacing one or more of the silanol-functional components normally used to prepare a silanol-functional SPSA compositions known in the art with an alkenyl-functional component.

SPSAs having sites of the formula ≡SiH, herein also denoted as a hydrogen-functional SPSA, can be prepared, for example, by replacing one or more of the silanol-functional components normally used to prepare a silanol-functional SPSA compositions known in the art with a hydrogen-functional component.

A preferred SPSA composition to be used to prepare the SPSA component of the compositions of this invention is a bodied SPSA composition. A bodied SPSA composition can be prepared by heating a solution of a silanol-functional SPSA in a solvent, such as a water-azeotroping hydrocarbon, at reflux until its silanol content has been reduced, preferably to a value of less than one weight percent.

The SPSA component of this invention bearing curing radicals can be prepared by a method wherein an ≡SiX-functional SPSA is reacted with a compound that will convert one or more ≡SiX groups in the SPSA to a curing radical having the formula noted above. As noted above, the curing radicals can be introduced into the organopolysiloxane resin portion, into the polydiorganosiloxane gum portion, into the SPSA after it has been prepared, or into any combination of said portions and SPSA. It should be understood that at least the polydiorganosiloxane gum or the organopolysiloxane resinous portion or the SPSA composition made therefrom must contain a sufficient number of ≡SiX reactive site to accomodate the introduction of the needed curing radicals.

Accordingly, in a second embodiment the present invention relates to a method comprising: reacting (i) a silicone pressure sensitive adhesive composition having reactive sites of the formula ≡SiX with (ii) a moisture-reactive compound having the formula $R_b(OR')_{3-b}SiY$ wherein Y denotes a radical which is reactive with ≡SiX, whereby the Y-substituted silicon atom is linked with the X-substituted silicon atom by a divalent Z radical, R denotes a monovalent hydrocarbon radical, R' denotes an alkyl or alkoxyalkyl radical, and the subscript b has a value of 0 or 1; all other silicon-bonded radicals in (i) being selected from the group consisting of divalent oxygen atoms linking silicon atoms, hydrogen atoms, hydroxyl radicals and monovalent hydrocarbon radicals.

The SPSA component bearing curing radicals having the formula $R_b(OR')_{3-b}SiZ$— can be prepared by any method wherein the Y radical of $R_b(OR')_{3-b}SiY$ reacts with an X radical of an X-substituted SPSA to form a Z radical, as noted above. The method for forming a Z radical can encompass the reactions of silicon chemistry, such as the reaction of silanols or of silicon hydrides; or of organic chemistry, such as the reaction of an alcohol with a carboxylic acid to form an ester linkage. Conveniently, for this purpose, one can adapt one or more of the several methods which are disclosed in the art for preparing moisture-curable silicone elastomers and/or sealants and U.S. Pat. Nos. 3,122,522; 3,161,614 (Re. 29,760); 3,175,993; 3,334,067; 4,100,129; 4,395,526; 4,599,394; 4,772,675; 4,847,400; and 4,962,174 are incorporated herein by reference to show the preparation of moisture-curable compositions which comprise silicon-bonded alkoxy groups and a catalyst.

In particular the disclosures of Weyenberg, U.S. Pat. No. 3,175,993; Lucas, U.S. Pat. No. 4,599,394; Klosowski and Meddaugh, U.S. Pat. No. 4,772,675; Krahnke and Saam, U.S. Pat. No. 4,847,400; and Bilgrien and Berg, U.S. Pat. No. 4,962,174 are noted for the preparation of the SPSA component bearing silicon-bonded curing radicals having the formula formula $Me_b(MeO)_{3-b}SiC_2H_4SiMe_2(OSiMe_2)_yD$— wherein y has an average value of from 0 to 6, preferably 0 to 1, each both inclusive.

The SPSA component bearing curing radicals can be prepared by the application of any of the above-noted processes to SPSA compositions and/or to one or more of their several components. Briefly, these methods comprise hydrosilylation reactions and silanol-converting reactions; the latter comprising the reaction of a silanol group with a silicon-bonded hydrolyzable radical such as amine, silylamine, alkoxy, halogen or acyloxy; or with a silicon-bonded hydrogen atom.

For example, $(MeO)_3SiCH_2CH_2$— radicals and $(MeO)_3SiCH_2CH_2SiMe_2OSiMe_2CH_2CH_2$— radicals can be introduced into a vinyl radical-containing SPSA component with compounds having the formula $(MeO)_3SiH$ and $(MeO)_3SiCH_2CH_2SiMe_2OSiMe_2H$, respectively. In this example Y=H or $CH_2CH_2SiMe_2OSiMe_2H$, respectively, and X=$CH_2$=CH—.

Radicals having the formulae $(MeO)_3SiO$— and $Me(MeO)_2SiO$— be introduced into a silanol-functional SPSA component with compounds having the formulae $(MeO)_4Si$ and $Me(MeO)_3Si$, respectively. Alternatively, compounds having the formulae $(MeO)_3SiH$ and $Me(MeO)_2SiH$, respectively, can be used. In these examples Y=MeO— or H, respectively, and X=OH.

$(MeO)_3SiCH_2CH_2SiMe_2O$—, $(MeO)_3SiCH_2CH_2SiMe_2O$— and $(MeO)_3SiCH_2CH_2SiMe_2CH_2CH_2SiMe_2O$— radicals can be introduced into a silanol-functional SPSA component by the use of compounds such as $(MeO)_3SiCH_2CH_2SiMe_2OSiMe_2H$, (MeO)₃SiCH₂CH₂SiMe₂CH₂CH₂SiMe₂H and (MeO)₃SiCH₂CH₂SiMe₂H.

Most conveniently, the SPSA component bearing curing radicals having the formula $R_b(OR')_{3-b}SiZ-$ is prepared by reacting a silanol-containing SPSA with a moisture-reactive compound having the formula $R_b(OR')_{3-b}SiY$ wherein Y bears a silicon-bonded hydrolyzable radical such as halogen, acyloxy, amino, amido, etc. In view of the type of by-products that are produced during the reaction Y preferably bears an amino nitrogen which provides an ammonia by-product.

Silazanes and disilazanes are preferred compounds for introducing the curing radicals into a silanol-functional SPSA, in view of the type of by-products that will be produced during the reaction. Examples of silazanes and disilazanes include (MeO)₃Si(CH₂CH₂SiMe₂)ₓ(OSiMe₂)ᵧNH₂ and {(MeO)₃Si(CH₂CH₂SiMe₂)ₓ(OSiMe₂)ᵧ}₂NH, such as {(MeO)₃SiCH₂CH₂SiMe₂}₂NH. A highly preferred curing radical for the composition of this invention is (MeO)₃SiC₂H₄SiMe₂O— because it can be readily introduced into the SPSA composition by way of a disilazane.

The SPSA component bearing silicon-bonded curing radicals having the formula $R_b(OR')_{3-b}SiZ-$ can bear any number of curing radicals; the rate and extent of cure of the SPSA composition, when exposed to moisture, being dependent on the concentration of curing radicals.

It is believed at this time that the SPSA component should contain an average of at least 1 millimol, preferably at least 2 millimols, of curing radicals per 100 parts by weight of SPSA component to obtain a desirable rate of cure. On the other hand it is currently believed that the SPSA component should contain no more than 100, preferably no more than 50, millimols of curing radicals per 100 parts of SPSA component to achieve a desirable adhesive strength. Of course, mols and parts are to be expressed in comparable terms. For example, 5 millimols and 100 parts can be expressed as 5 milligram-mols and 100 gram parts or as 5 millipound-mols and 100 pound parts.

A suitable catalyst should be used when introducing curing radicals into the SPSA component. For example, when using a silicon hydride to introduce curing radicals it is desirable to use a platinum group metal catalyst such as platinum or rhodium and its compounds and complexes to accelerate the hydrosilylation reaction. When using a silazane to introduce curing radicals it is desirable to use a strong acid catalyst such as trifluoroacetic acid. When using an alkoxysilane to introduce curing radicals it is desirable to use a titanate catalyst such as tetrabutyl titanate.

In addition to a SPSA component bearing silicon-bonded curing radicals the compositions of this invention preferably further comprise an effective amount of a catalyst component to accelerate the reaction of the curing radicals with moisture to form siloxane bonds.

Catalysts for accelerating the reaction of the OR' radicals with moisture to form siloxane bonds are well known in the silicone elastomer art and need no detailed delineation herein. Briefly, said catalysts include, but are not limited to, metal salts of monocarboxylic acids, such as stannous octoate, dibutyltin dilaurate and dibutyltin diacetate; titanium esters, such as tetrabutyl titanate, tetraethylhexyl titanate and tetraphenyltitanate; siloxytitanates, such as tetrakis(trimethylsiloxy)titanium and bis(trimethylsiloxy)-bis(isopropoxy)titanium; and betadicarbonyltitanium compounds, such as bis(acetylacetonyl)diisopropyl titanate; amines, such as hexylamine; and their acetate and quat salts.

Preferred catalysts are bis(acetylacetonyl)diisopropyl titanate and certain orthotitanates, such as tetrabutyl titanate, and their partial hydrolyzates. The amount of titanium-containing catalysts typically ranges from 0.1 to 2%, based on the weight of the SPSA component.

The compositions of this invention can be prepared by introducing curing radicals of the formula noted above into a SPSA, preferably dissolved in a solvent, and, if desired, thereafter admixing a suitable amount of the catalyst component. The solvent component can be any liquid that will dissolve the SPSA and the curing radical-containing SPSA component without adversely reacting therewith in the absence of moisture. Examples of suitable solvents include aromatic hydrocarbons, such as benzene, toluene and xylene; aliphatic hydrocarbons, such as hexane, heptane and cyclohexane; halogenated hydrocarbons such as chlorocarbons; oxygenated solvents such as esters, ketones and lower alcohols; and volatile siloxanes such as hexamethyldisiloxane and cyclopolydimethylsiloxanes.

The compositions of this invention typically, but not necessarily, further comprise an appropriate quantity of a solvent to provide for a lower viscosity, and hence an easier application of, the SPSA composition to various substrates. Concrete examples of this component are the same as those delineated above for use during the preparation of the SPSA component and mixtures thereof. The amount of solvent is not critical; however, only a sufficient amount to facilitate the preparation, handling and applying of the composition is recommended. The solvent, when used, is preferably a nonreactive hydrocarbon solvent or siloxane solvent and is preferably used in an amount sufficient to provide a viscosity of from 10,000 to 100,000 centipoise at 25° C. for the composition. It has been found convenient, but not necessary, to prepare the SPSA component in a solvent that can be allowed to remain in the final composition.

Concrete examples of this component are the same as those delineated above for use during the preparation of the SPSA component and mixtures thereof. The solvent, when used, is preferably a non-reactive hydrocarbon solvent or siloxane solvent. It has been found convenient, but not necessary, to prepare the SPSA component in a solvent that can be allowed to remain in the final composition as a viscosity-adjusting solvent.

The compositions of this invention can be used in all of the applications to which the SPSA compositions of the art are directed since they possess adhesive properties in their uncured state, one or more of which will improve upon exposure to ambient moisture. Additionally, the compositions of this invention can be used in all of the applications to which the permanent adhesive compositions of the art are directed since certain embodiments thereof will cure to the permanent adhesive state upon exposure to ambient moisture. It is expected that the compositions of this invention will satisfy other adhesive needs in view of their moisture-activated curing capability.

Typically, the use of the compositions of this invention comprises applying a composition of this invention to a substrate; removing substantially all of the solvent from the applied composition to provide an adhesive-bearing substrate; and adhering the adhesive-bearing substrate to a surface. Optionally, one can expose the adhesive on the adhered substrate to moisture to improve one or more adhesive properties selected from tack, peel adhesion, tensile adhesion, adhesive failure mode, yield modulus, modulus at cohesive failure, etc.

Preferably, a composition of this invention is applied to the substrate and devolatilized before any substantial gelling of the composition occurs. For compositions of this invention comprising a catalyst component it is recommended that the composition be prepared within a day or two of being applied to the substrate and devolatilized. Thereafter it is preferred to apply the adhesive-bearing substrate to the surface before the adhesive has experienced a complete loss of tack. It is recommended that the adhesive-bearing substrate be applied to the surface within a few days to a few weeks after being prepared. If there is any delay in applying the adhesive-bearing substrate to the surface it is recommended to maintain the adhesive under substantially anhydrous conditions.

The substrate and surface can have any solid form and can comprise any material. Examples of suitable forms include decorative articles, devices and mechanical parts in elastomer, foam, flexible or rigid consistency. Examples of suitable materials include ferrous and non-ferrous metals, such as aluminum, iron, copper, tin, silver, gold, platinum and their several alloys; synthetic polymeric materials, such as polyolefins, polyesters, polyamides, polyacrylates, polyfluoroolefins and polysiloxanes; cellulosic materials, such as paper and wood; textile materials, such as cotton and its blends; and siliceous materials, such as glass, cement, concrete, brick, ceramic, porcelain, china, quartz and crystal.

The following disclosure is to illustrate, but not limit, the present invention, which is properly delineated by the appended claims. Unless stated otherwise, all ratios, parts and percentages are by weight and temperatures are in degrees Celsius.

Measurement of Peel Adhesion and Tack

Unless otherwise stated, a 50% solution of SPSA was cast onto 2-mil Mylar(R), drawn down with a 3 mil bird bar (Gardner Pacific) and the film was heated at 70° for 3 minutes to remove volatile material and provide a dry adhesive thickness of 1.5 mils.

Peel adhesion (Adh) of a SPSA was measured by applying a 6"×1" strip of the Mylar-backed adhesive to a clean 2"×6" stainless steel panel using two passes of a 2 kg rubber-coated roller. The force required to remove the tape therefrom was measured with a Keil Tester at a peel angle of 180° at a rate of 12 inches/minute. The values recorded are the average of multiple readings taken during the course of one pull per sample. The Keil Tester is described in TAPPI, vol. 43, No. 8. pages 164A and 165A (August 1960).

Tack was measured on 6-1" squares of the Mylar-backed adhesive using a POLYKEN (R) brand probe tack tester (Testing Machines, Inc,; Amityville, N.Y.). The test procedure used a 20 gram weight, a dwell time of 0.5 seconds and a pull speed of 0.5 cm/sec. and the results are the average of the six readings expressed in units of grams.

Measurement of Tensile Adhesion

Tensile Adhesion (TA) was measured in accordance with ASTM C 1135-90, "Standard Test Method for Determining Tensile Adhesion of Structural Sealants", except as follows: the test specimens were conditioned at 23° C. for 0, 3, 7, 14, 30, 60 and 90 days, in addition to the 21 days required by ASTM C 1135-90; and the test specimens were assembled with an adhesive-bearing core of cured silicone rubber, rather than a solid plug of sealant, which was cured in contact with the panels of the test specimen.

The silicone rubber core was one-half of a honeycombed extrusion of cured silicone rubber having a durometer of 70 and dimensions of 1"h×½"w×2"l and having 17 cylindrical holes, 3/32" i.d.×2"l, arranged in three columns of 6, 5 and 6 holes, evenly spaced. The extrusion was cut in half along its width to produce the core having dimensions of ½"h×½"w× 2"l and having 8 cylindrical holes in the body of the core and 1 semi-cylindrical groove along one non-bonding surface of the core. The bonding surfaces were adjacent to the groove-bearing surface.

The adhesive-bearing core was prepared by one of two methods, i.e., the Core Coating method or the Transfer Film method.

In the core coating method a solution of SPSA was applied to both bonding surfaces of the core of silicone rubber, at a wet thickness of 10 mils and devolatilized at 70° C. to provide the adhesive-bearing core. To assemble the test specimen the exposed adhesive surfaces were adhered to the 1"×3" panels of the test specimen.

In the transfer film method a solution of SPSA was applied to a release liner in a wet thickness of 10 mils, unless stated otherwise, and the applied solution was devolatilized at 70° C. for 5 minutes. To assemble the adhesive-bearing core the devolatilized SPSA, with its release liner, was adhered to one bonding surface of the silicone rubber core. The process was repeated on the other bonding surface of the core. To assemble the test specimen the release liners were removed from the transferred adhesive and the exposed adhesive surfaces were adhered to the 1"×3" panels of the test specimen.

Materials

TBT—Tetrabutyl titanate.

MTM—Methyltrimethoxy silane.

TDIDE—Titanium diisopropoxy-bis(ethylacetoacetate).

TFAA—Trifluoroacetic acid.

ETMDZ(C)—A reaction mixture of 15.6% non-silazane materials comprising 5% starting materials and 10.6% $\{(MeO)_3SiCH_2\}_2$; 79.8% silazane materials comprising 10.6% $\{(MeO)_3SiC_2H_4SiMe_2NHSiMe_2CH_2\}_2$, 69.2% $\{(MeO)_3SiC_2H_4SiMe_2\}_2NH$ and 4.6% unidentified products; prepared by adding tetramethyldisilazane to a mixture of vinyltrimethoxy silane and chloroplatinic acid complexed with divinyltetramethyldisiloxane.

ETMDZ(F)—Substantially pure $\{(MeO)_3SiC_2H_4SiMe_2\}_2NH$, prepared by fractionating ETMDZ(C).

ETMDZ(D)—A mixture of 11.6% non-silazane materials comprising 1.4% unidentified by-products and 10.2% $\{(MeO)_3SiCH_2\}_2$, and 88.4% silazane materials comprising 1.8% $\{(MeO)_3SiC_2H_4SiMe_2NHSiMe_2CH_2\}_2$ and 86.5% isomers having the formula $\{(MeO)_3SiC_2H_4SiMe_2\}_2NH$; prepared by distilling ETMDZ(C).

ETMSH—A mixture of $(MeO)_3SiC_2H_4SiMe_2OSiMe_2H$, 96%; 2% vinyltrimethoxy silane and 2% tetramethyldisiloxane, prepared by adding vinyltrimethoxy silane to a mixture of tetramethyldisiloxane and chloroplatinic acid complexed with divinyltetramethyldisiloxane and distilling the reaction product.

Polymer A—A hydroxyl-terminated polydimethylsiloxane gum having a plasticity number of 137–152, as measured by ASTM 926–67, and a viscosity of at least 10,000,000 centipoise at 25°.

Polymer B—A hydroxyl-terminated polydimethylmethylvinylsiloxane gum having 4 mol % vinyl-containing siloxane units, a plasticity number of 137–152, as measured by ASTM 926–67, and a viscosity of at least 10,000,000 centipoise at 25°.

Solution A—A xylene solution containing 70% of a soluble organopolysiloxane consisting of $(CH_3)_3SiO_{1/2}$ units and $SiO_{4/2}$ units in a mol ratio of 0.8/1 and having a hydroxyl content of 3.45% and $M_n$=1,963, $M_w/M_n$=2.57 as measured by gel-permeation chromatography using Varian TSK 4000+2500 columns at 35°, a chloroform mobile phase at 1 mL/m and an IR detector set at 8.5 microns to detect $SiO_2$. Polystyrene standards were used for linear regression calibrations.

Solution B—A SPSA composition containing 45% xylene and volatile siloxanes and 55% of a bodied SPSA consisting of 55% of the organopolysiloxane resin of Solution A and 45% of OH-endblocked polydimethylsiloxane gum having a plasticity of about 150 and a silicon-bonded hydroxyl content of 0.45% (26 milligram-mols of silanol per 100 and grams of bodied SPSA solids.

EXAMPLE 1

Solution A, 98.5 parts; Polymer A, 56.3 parts, and xylene, 149.9 parts, were mixed to homogeniety and a mixture of 39.4 parts of MTM and 0.15 parts of TBT was added thereto. The resulting mixture was heated from 90° to 141° over a 4.5 hour period as 112.6 parts of volatile material were distilled from the mixture. The solution was cooled to room temperature and stored in the absence of moisture for two days. The resulting SPSA composition bearing $Me(MeO)_2SiO$-curing radicals was then tested for tack and adhesive strength at several levels of TBT or TBT plus additional MTM after 1 and 7 days exposure to ambient moisture. All adhesives had poor cohesive strength immediately after being catalyzed; however, the increased peel adhesion results after 1 and 7 days, shown in Table I, indicate that a curing reaction occurred in the presence of moisture. Additionally, where cohesive failure existed in the 1-day old adhesive an improvement to adhesive failure was obtained.

EXAMPLE 2

Solution A, 86.4 parts; Polymer A, 66.7 parts, and xylene, 153.6 parts, were mixed to homogeniety and a mixture of 34.6 parts of MTM and 0.13 parts of TBT was added thereto. The resulting mixture was heated from 90° to 137° over a 4.25 hour period as 87.6 parts of volatile material were distilled from the mixture. The solution was cooled to room temperature and gummy material was stored in the absence of moisture for 3 days. The resulting SPSA composition bearing $Me(MeO)_2SiO$— curing radicals was then tested for tack and adhesive strength at several levels of TBT, or TBT plus additional MTM, after 1 and 7 days exposure to ambient moisture. All adhesives had poor cohesive strength immediately after being catalyzed; however, the results after 1 and 7 days, shown in Table I, indicate that an increase in peel adhesion occurred in the presence of moisture. Additionally, where cohesive failure existed in the 1-day old adhesive an improvement was obtained in a majority of compositions after 7 days of exposure to moisture.

TABLE I

| | | Example 1 | | | | Example 2 | | | |
| | | 1 Day | | 7 Days | | 1 Day | | 7 Days | |
| MTM, % | TBT, % | Tack | Adh | Tack | Adh | Tack | Adh | Tack | Adh |
| --- | --- | --- | --- | --- | --- | --- | --- | --- | --- |
| 0.0 | 0.0 | 508 | 3a | 464 | 15 | 456 | 16c | 577 | 46c |
| 0.0 | 0.25 | 576 | 19a | 481 | 45a | 498 | 22c | 665 | 56c |
| 0.0 | 0.5 | 643 | 31a | 604 | 55a | 506 | 26c | 663 | 30a |
| 0.0 | 1.0 | 752 | 30a | 729 | 40a | 510 | 26c | 676 | 49b |
| 2.5 | 0.25 | 555 | 27c | 534 | 42a | 522 | 23c | 670 | 51c |
| 5.0 | 0.5 | 707 | 24a | 579 | 42a | 561 | 27c | 717 | 40a |
| 10.0 | 1.0 | 630 | 25a | 628 | 31a | 568 | 28c | 731 | 30a | a = adhesive failure; c = cohesive failure; b = cohesive and adhesive failure.

EXAMPLES 3–5

A mixture of 75 parts Polymer B, 142.6 parts Solution A, 60 parts toluene and 0.6 parts of an acetylenic alcohol was heated at reflux (124°) for 5 hours to body the SPSA. Three portions of the bodied SPSA solution were separated and treated with 4.89% (Example 3), 6.12% (Example 4) or 7.34% (Example 5) of ETMSH, based on SPSA solids to convert various amounts of vinyl radicals to curing radicals. Each portion was mixed with one part of platinum catalyst per 100 parts of ETMSH and allowed to stand at room temperature overnight. All gelled in the vial after one week at room temperature; however, before the compositions gelled portions were used to make adhesive films as follows. Method 1 (Examples 3*, 4* & 5*) consisted of casting the composition on a backing and evaporating the solvent, i.e., no moisture-curing catalyst was used. Method 2 (Examples 3, 4 & 5) was the same as Method 1, except a percentage of titanium catalyst, based on SPSA solids, was used as a moisture-curing catalyst. The results of the tack and adhesion measurements, taken on the solvent-free adhesive films after 0 days, 1 day and 7 days of exposure to atmospheric moisture are listed in Table II. All compositions experienced cure to less tacky adhesives with catalyzed compositions curing faster than uncatalyzed compositions.

TABLE II

| Ex- | | | 0 Days | | 1 Day | | 7 Days | |
| ample | H/Vi | TDIDE | Tack | Adh | Tack | Adh | Tack | Adh |
| --- | --- | --- | --- | --- | --- | --- | --- | --- |
| 3 | 0.8/1 | 2% | 754 | 29 | 699 | 32 | 505 | 30 |
| 4 | 1.0/1 | 2% | 695 | 23 | 686 | 28 | 495 | 20 |
| 5 | 1.2/1 | 2% | 692 | 29 | 697 | 28 | 518 | 24 |
| 3* | 0.8/1 | 0% | 842 | 43 | 774 | 45 | 638 | 37 |
| 4* | 1.0/1 | 0% | 824 | 44 | 712 | 42 | 659 | 34 |
| 5* | 1.2/1 | 0% | 923 | 45 | 874 | 47 | 710 | 33 |

*Composition not catalyzed.

EXAMPLES 6–12

Under a dry nitrogen sweep appropriate amounts (listed in Table III) of ETMDZ(D), except ETMDZ(F) for Examples 9 and 10, and TFAA were dissolved in Solution B and the solutions were heated at 100° for about one hour to react the percentage of SPSA silanols indicated in Table III.

The resulting compositions of this invention containing approximately 40–50% solvent were catalyzed with 1% TBT, based on solution weight, and the catalyzed compositions were tested for tack, peel adhesion and tensile adhesion properties after being exposed to ambient moisture in accordance with the methods described above. The uncatalyzed compositions also were similarly tested. The results have been summarized in Tables III and IV.

The stress/strain behavior of some of the compositions which were maintained in the absence of moisture are summarized in Table V. Test samples for measuring stress/strain behavior were prepared by casting catalyzed SPSA solutions at a wet thickness of 50 mils onto a release liner and gradually removing the solvent over a period of 20 hours and over a temperature range of from 20°–70°. A dog bone shape die (Dewes-Gumbs Die Company) with a 1" guage length and a ¼" guage width was used to stamp test samples from the SPSA film/release liner laminate. The SPSA film was carefully peeled from the liner without deforming the SPSA film and secured into an Instron tester by its tabs so as to provide a 1" gauge length. The sample was pulled at a rate of 10'/minute and the force was recorded on an X-Y recorder. Stress was calculated by dividing the force output by test sample cross-section. Strain was approximated by dividing the distance the crosshead traveled by the initial gauge length and multiplying by 100.

An examination of the data in Table III shows that catalyzed compositions wherein at least 0.2 mols of $\{(MeO)_3SiC_2H_4Me_2\}_2NH$ per mol of silanol in the SPSA is reacted with the SPSA rapidly cure to a adhesives having little or no tack and/or adhesion; i.e., permanent adhesives.

Table IV shows that the compositions of this invention are sufficiently strong to be useful as a structural glazing adhesive when applied either directly to the core or transferred to the core as an adhesive film. Contrastingly, the control composition (i) is not sufficiently strong, initially or after 14 days exposure to ambient moisture, to be useful as a structural glazing adhesive when applied by either the direct or transfer manner.

Table V shows that the compositions which have a greater percentage of residual hydroxyl groups on the SPSA experience a greater change in yield stress, and have a lesser stability, when catalyzed.

TABLE III

| | ETMDZ Amount | | 0 Days | | 7 Days | | 21 Days | |
|---|---|---|---|---|---|---|---|---|
| Ex | Mol %* | grams | Tack | Adh | Tack | Adh | Tack | Adh |
| 6 | 10 | 0.917 | 929 | 47 | 1014 | 53 | 647 | 49 |
| 7 | 20 | 1.839 | 336 | 39 | 210 | 28 | 25 | 26 |
| 8 | 25 | 2.298 | 248 | 2 | 0 | 5 | 0 | 1 |
| 9 | 35 | 2.653 | 378 | 44 | 28 | 7 | 28 | 3 |
| 10 | 45 | 3.414 | 280 | 44 | 25 | 1 | 14 | 1 |
| 11 | 55 | 5.053 | 310 | 37 | 0 | 1 | 0 | 1 |
| 12 | 75 | 6.894 | 462 | 39 | 7 | 1 | 0 | 1 |
| 6** | 10 | 0.917 | 1097 | 35 | 958 | 48 | 633 | 51 |
| 7** | 20 | 1.839 | 1092 | 38 | 874 | 44 | 663 | 50 |
| 8** | 25 | 2.298 | 803 | 21 | 560 | 30 | 360 | 30 |
| 9** | 35 | 2.653 | 1065 | 42 | 942 | 53 | 724 | 56 |
| 10** | 45 | 3.414 | 1105 | 43 | 768 | 48 | 751 | 44 |
| 11** | 55 | 5.053 | 930 | 44 | 433 | 33 | 137 | 5 |
| 12** | 75 | 6.894 | 959 | 40 | 539 | 26 | 335 | 20 |

TABLE III-continued

| | ETMDZ Amount | | 0 Days | | 7 Days | | 21 Days | |
|---|---|---|---|---|---|---|---|---|
| Ex | Mol %* | grams | Tack | Adh | Tack | Adh | Tack | Adh |

*Based on mols of silanol in SPSA.
**Composition not catalyzed.

TABLE IV

| Ex | 0 Days TA, psi | 3 Days TA, psi | 7 Days TA, psi | 14 Days TA, psi | Comments |
|---|---|---|---|---|---|
| 6 | 71.8 | 84.7 | 105.0 | 96.9 | Core coating |
| 7 | 71.5 | — | 62.4 | 44.3 | Core coating |
| 8 | 67.8 | 89.3 | 82.4 | 80.6 | Core coating |
| 12 | 63.2 | 116.4 | 116.7 | 93.1 | Core coating |
| 6 | 71.0 | — | 78.6 | 90.4 | Transfer film |
| 10 | 77.7 | 102.3 | 101.8 | 114.9 | Transfer film |
| 12 | 106.7 | 119.6 | 119.1 | 126.0 | Transfer film |
| 6* | 40.5 | 52.0 | 58.6 | 54.2 | Core coating |
| 7* | 63.2 | 71.6 | 71.1 | 70.3 | Core coating |
| i* | 29.6 | 56.5 | 51.0 | 54.6 | Core coating |
| i* | 35.6 | 49.1 | 34.2 | 44.1 | Transfer film |

*Composition not catalyzed; i = Solution B adhesive.

TABLE V

| | Yield Stress (psi)/Strain (%) | | |
|---|---|---|---|
| Example | Catalyzed | Uncatalyzed | Comments |
| 6 | 247.7/10 | 64.5/10 | Not enough capping to be stable. |
| 7 | — | 86.2/10 | |
| 8 | 117.4/20 | 125.2/10 | Fully stable. |
| 9 | 106.3/20 | 90.4/20 | Some instability. |

EXAMPLE 13

A mixture of 107.8 parts of Solution A, 45.2 parts of MTM (2 molecules of silane for each silanol in the resin) and 3 parts of TDIDE was allowed to react at room temperature for 2 days to silylate silanols in the resin. A SPSA composition of this invention was prepared by mixing to homogeniety 156 parts of the silylated resin solution, 83 parts of toluene, 59.3 parts of Polymer B and 1% TDIDE, based on gum plus resin solids. The composition was tested for adhesive properties immediately and after 21 days. Tack was found to have decreased from 620 to 240 grams, indicating that a curing reaction occurred in the presence of moisture, and peel adhesion was found to have increased from 20 to 45 ounces per inch.

That which is claimed is:

1. A composition comprising a silicone pressure sensitive adhesive component bearing curing radicals having the formula $(MeO)_3SiC_2H_4SiMe_2O-$ wherein Me denotes methyl and wherein the silicone pressure sensitive adhesive component bearing curing radicals has been prepared by a method comprising reacting (i) a silicone pressure sensitive adhesive composition having reactive sites of the formula $\equiv SiX$, and X denotes an alkenyl radical, a hydroxyl radical or a hydrogen atom, substantially all X being OH, with (ii) a moisture-reactive compound having the formula $\{(MeO)_3SiC_2H_4SiMe_2\}_2NH$; all other silicon-bonded radicals in (i) being selected from the group consisting of divalent oxygen atoms linking silicon atoms, hydrogen atoms and monovalent hydrocarbon radicals.

2. A composition in accordance with claim 1 further comprising an effective amount of a catalyst component to accelerate a reaction of the curing radicals with moisture to form siloxane bonds.

3. A composition in accordance with claim 2 wherein the silicone pressure sensitive adhesive composition comprises a bodies mixture of (1) 40 to 60 parts by weight of a silanol-containing organopolysiloxane resinous portion comprising $Me_3SiO_{1/2}$ siloxane units and $SiO_{4/2}$ siloxane units, wherein the mol ratio of the $Me_3SiO_{1/2}$ siloxane units to $SiO_{4/2}$ siloxane units has a value of from 0.6/1 to 9/1 and (2) 40 to 60 parts by weight of a polydimethylsiloxane gum having a viscosity at 25° C. of at least 1,000,000 centipoise, and the catalyst component is a titanate.

4. A composition in accordance with claim 3 wherein the titanate comprises tetrabutyl titanate or titanium diisopropoxy-bis-(ethylacetoacetate).

5. A composition in accordance with claim 4 bearing from 2 to 50 millimols of curing radicals per 100 parts by weight of the silicone pressure sensitive adhesive component.

6. A composition in accordance with claim 1 further comprising a solvent for the moisture-curable silicone pressure sensitive adhesive.

7. A composition in accordance with claim 1 wherein the moisture-reactive compound $\{(MeO)_3SiC_2H_4SiMe_2\}_2NH$ has been prepared by adding tetramethyldisilazane to a mixture of vinyltrimethoxy silane and chloroplatinic acid, complexed with divinyltetramethyldisiloxane, and allowing a hydrosilylation reaction to occur.

8. A composition in accordance with claim 7 wherein the amount of moisture-reactive compound is sufficient to react with from 2 to 50 millimols of said silicon-bonded hydroxyl radicals for every 100 parts by weight of the silicone pressure sensitive adhesive component having reactive sites.

9. A composition in accordance with claim 8 wherein a solvent component for component (i) is used during said reacting.

10. A silicone pressure sensitive adhesive bearing curing radicals of the formula $(MeO)_3SiC_2H_4SiMe_2$-obtained by the method comprising reacting (i) a silicone pressure sensitive adhesive composition having reactive sites of the formula $\equiv SiX$ and X denotes an alkenyl radical, a hydroxyl radical or a hydrogen atom, substantially all X radicals being hydroxyl, with (ii) a moisture-reactive compound having the formula $\{(MeO)_3SiC_2H_4SiMe_2\}_2NH$, Me denotes methyl; all other silicon-bonded radicals in (i) being selected from the group consisting of divalent oxygen atoms linking silicon atoms, hydrogen atoms, hydroxyl radicals and monovalent hydrocarbon radicals.

11. The silicone pressure sensitive adhesive as claimed in claim 10 wherein the silicone pressure sensitive adhesive component (i) is prepared by bodying a mixture of (1) 40 to 60 parts by weight of an organopolysiloxane resinous portion comprising $Me_3SiO_{1/2}$ siloxane units and $SiO_{4/2}$ siloxane units, wherein the mole ratio of the $Me_3SiO_{1/2}$ siloxane units to $SiO_{4/2}$ siloxane units has a value of from 0.6/1 to 0.9/1 wherein Me represents a methyl radical; and (2) 40 to 60 parts by weight of a polydimethylsiloxane gum having a viscosity at 25° C. of at least 1,000,000 centipoise; and said reacting is promoted by the action of an acid catalyst.

12. The silicone pressure sensitive adhesive as claimed in claim 11 wherein the moisture-reactive compound $\{(MeO)_3SiC_2H_4SiMe_2\}_2NH$ has been prepared by adding tetramethyldisilazane to a mixture of vinyltrimethoxy silane and chloroplatinic acid complexed with divinyltetramethyldisiloxane and allowing a hydrosilylation reaction to occur.

13. The silicone pressure sensitive adhesive as claimed in claim 12 wherein the amount of moisture-reactive compound is sufficient to react with from 2 to 50 millimols of said silicon-bonded hydroxyl radicals in every 100 parts by weight of silicone pressure sensitive adhesive composition by having reactive sites.

14. The silicone pressure sensitive adhesive as claimed in claim 13 wherein there is additionally present a solvent component for component (i) during said reacting.

15. The silicone pressure sensitive adhesive as claimed in claim 14 wherein the method further comprises mixing an effective amount of a catalyst component to accelerate any reaction of the curing radicals with moisture to form siloxane bonds.

16. A composition comprising a moisture-curable silicone pressure sensitive adhesive selected from the group consisting of a mixture of an organopolysiloxane resin with a polydiorganosiloxane gum having a viscosity at 25° C. of at least 1,000,000 centipoise and a bodied product thereof wherein at least one of said organopolysiloxane resin, said polydiorganosiloxane gum or said bodied product bears curing radicals having the formula $R_b(R'O)_{3-b}SiZ-$ wherein Z denotes a divalent radical linking the silicon atom of the curing radical to a silicon atom of the silicone pressure sensitive adhesive, R denotes a monovalent hydrocarbon radical, R' denotes an alkyl radical or alkoxyalkyl radical, and the subscript b has a value of 0 or 1; all other silicon-bonded radicals of the silicone pressure sensitive adhesive being selected from the group consisting of divalent oxygen atoms linking silicon atoms, hydrogen atoms and monovalent hydrocarbon radicals.

17. A composition in accordance with claim 16, further comprising an effective amount of a catalyst to accelerate the reaction of the curing radicals with moisture to form siloxane bonds.

18. A composition in accordance with claim 17, wherein said silicone pressure sensitive adhesive comprises a bodied product of (i) 40 to 60 parts by weight of a silanol-containing organopolysiloxane resinous portion comprising $Me_3SiO_{1/2}$ siloxane units and $SiO_{4/2}$ siloxane units, wherein the mole ratio of the $Me_3SiO_{1/2}$ siloxane units to $SiO_{4/2}$ siloxane units has a value of from 0.6/1 to 0.9/1 wherein Me represents a methyl radical; and (ii) 40 to 60 parts by weight of a polydimethylsiloxane gum having a viscosity at 25° C. of at least 1,000,000 centipoise, and wherein said curing radicals have the formula $Me_b(MeO)_{3-b}Si(C_2H_4SiMe_2)_x(OSiMe_2)_yD-$ in which Me denotes methyl, b is 0 or 1, D denotes oxygen or $-C_2H_4-$, x=0 to 2 and y has an average value of from 0 to 6, both inclusive; and said catalyst is a titanate.

19. A composition in accordance with claim 18, wherein the curing radicals have the formula $(MeO)_3SiC_2H_4SiMe_2O-$ in which Me represents a methyl radical.

\* \* \* \* \*